(12) United States Patent
Aaron et al.

(10) Patent No.: US 8,098,582 B2
(45) Date of Patent: Jan. 17, 2012

(54) METHODS, SYSTEMS, AND COMPUTER PROGRAM PRODUCTS FOR IMPLEMENTING BANDWIDTH CONTROL SERVICES

(75) Inventors: Jeffrey A. Aaron, Atlanta, GA (US); James Carlton Bedingfield, Sr., Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1095 days.

(21) Appl. No.: 11/304,330

(22) Filed: Dec. 14, 2005

(65) Prior Publication Data
US 2006/0222008 A1  Oct. 5, 2006

Related U.S. Application Data

(60) Provisional application No. 60/667,018, filed on Mar. 31, 2005.

(51) Int. Cl.
*H04J 1/16* (2006.01)

(52) U.S. Cl. ............ 370/235; 370/252; 370/395.21; 370/468; 709/223

(58) Field of Classification Search ............ 370/395.21, 370/400; 709/227
See application file for complete search history.

(56) References Cited

U.S. PATENT DOCUMENTS

| | | | |
|---|---|---|---|
| 4,017,676 A | 4/1977 | Rabeler et al. | |
| 4,380,687 A | 4/1983 | Stewart | |
| 4,439,784 A | 3/1984 | Furukawa et al. | |
| 4,769,697 A | 9/1988 | Gilley et al. | |
| 4,802,022 A | 1/1989 | Harada | |
| 4,903,130 A | 2/1990 | Kitagawa et al. | |
| 4,907,079 A | 3/1990 | Turner et al. | |
| 5,255,180 A | 10/1993 | Shinoda et al. | |
| 5,278,654 A | 1/1994 | Yang | |
| 5,313,282 A | 5/1994 | Hayashi | |
| 5,331,354 A | 7/1994 | Koyama et al. | |
| 5,731,764 A | 3/1998 | Tanaka | |
| 5,793,409 A | 8/1998 | Tetsumura | |
| 5,844,600 A | 12/1998 | Kerr | |
| 5,874,986 A | 2/1999 | Gibbon et al. | |
| 5,892,856 A | 4/1999 | Cooper et al. | |
| 5,892,859 A | 4/1999 | Grote | |

(Continued)

FOREIGN PATENT DOCUMENTS
WO WO03058478 7/2003

OTHER PUBLICATIONS

D'Hont, Susy, "The Cutting Edge of RFID Technology and Applications for Manufacturing and Distribution," Texas Instruments, TIRIS, pp. 1-13.

(Continued)

*Primary Examiner* — Seema S Rao
*Assistant Examiner* — Wanda Z Russell
(74) *Attorney, Agent, or Firm* — Cantor Colburn LLP

(57) ABSTRACT

Methods, systems, and computer program products for implementing bandwidth control services are provided. The method includes assigning a quality of service preference to a device. The method also includes associating a service session with the device. The method further includes executing a control action for at least one other simultaneously occurring service session when a quality of service level of the service session differs from the quality of service preference by a specified degree. The control action is operable for producing and maintaining the quality of service preference.

20 Claims, 3 Drawing Sheets

U.S. PATENT DOCUMENTS

| | | | |
|---|---|---|---|
| 5,995,153 A | 11/1999 | Moeller et al. | |
| 6,014,694 A | 1/2000 | Aharoni et al. | |
| 6,025,869 A | 2/2000 | Stas et al. | |
| 6,052,734 A | 4/2000 | Ito et al. | |
| 6,057,872 A | 5/2000 | Candelore | |
| 6,078,589 A | 6/2000 | Kuechler | |
| 6,147,992 A | 11/2000 | Giroir et al. | |
| 6,177,931 B1 | 1/2001 | Alexander et al. | |
| 6,216,956 B1 | 4/2001 | Ehlers et al. | |
| 6,237,022 B1 | 5/2001 | Bruck | |
| 6,240,460 B1 | 5/2001 | Mitsutake et al. | |
| 6,260,111 B1 | 7/2001 | Craig et al. | |
| 6,315,668 B1 | 11/2001 | Metke et al. | |
| 6,324,182 B1 | 11/2001 | Burns | |
| 6,400,687 B1 | 6/2002 | Davison et al. | |
| 6,480,753 B1 | 11/2002 | Calder et al. | |
| 6,591,423 B1 | 7/2003 | Campbell | |
| 6,594,826 B1 | 7/2003 | Rao et al. | |
| 6,609,253 B1 | 8/2003 | Swix et al. | |
| 6,631,118 B1 | 10/2003 | Jones | |
| 6,647,411 B2 | 11/2003 | Towell | |
| 6,717,507 B1 | 4/2004 | Bayley et al. | |
| 6,741,563 B2 | 5/2004 | Packer | |
| 6,757,796 B1 | 6/2004 | Hofmann | |
| 6,771,661 B1 | 8/2004 | Chawla et al. | |
| 6,796,787 B2 | 9/2004 | Okada | |
| 6,810,528 B1 | 10/2004 | Chatani | |
| 6,816,903 B1 | 11/2004 | Rakoshitz et al. | |
| 6,839,052 B1 | 1/2005 | Kramer | |
| 6,870,463 B2 | 3/2005 | Dresti et al. | |
| 6,889,382 B1 | 5/2005 | Anderson | |
| 6,961,341 B1 | 11/2005 | Krishnan | |
| 6,973,066 B2 | 12/2005 | Gutowski | |
| 7,000,246 B1 | 2/2006 | Takao | |
| 7,065,586 B2 | 6/2006 | Ruttenberg et al. | |
| 7,151,939 B2 | 12/2006 | Sheynblat | |
| 7,277,894 B2 | 10/2007 | Kondo et al. | |
| 7,284,201 B2 | 10/2007 | Cohen-Solal | |
| 7,437,073 B2 | 10/2008 | Kim et al. | |
| 7,512,650 B2 | 3/2009 | Richardson | |
| 7,519,703 B1 | 4/2009 | Stuart et al. | |
| 2001/0031633 A1 | 10/2001 | Tuomela et al. | |
| 2001/0043571 A1 | 11/2001 | Jang et al. | |
| 2002/0002708 A1* | 1/2002 | Arye | 725/95 |
| 2002/0018645 A1 | 2/2002 | Nakamatsu et al. | |
| 2002/0046099 A1 | 4/2002 | Frengut et al. | |
| 2002/0080721 A1 | 6/2002 | Tobagi et al. | |
| 2002/0083443 A1 | 6/2002 | Eldering et al. | |
| 2002/0104087 A1 | 8/2002 | Schaffer et al. | |
| 2002/0108127 A1 | 8/2002 | Lew | |
| 2002/0133830 A1 | 9/2002 | Kim et al. | |
| 2002/0144259 A1 | 10/2002 | Gutta et al. | |
| 2002/0164987 A1 | 11/2002 | Caronni et al. | |
| 2002/0178440 A1 | 11/2002 | Agnihotri et al. | |
| 2002/0194586 A1 | 12/2002 | Gutta et al. | |
| 2003/0002642 A1 | 1/2003 | Jorasch et al. | |
| 2003/0002862 A1 | 1/2003 | Rodriguez et al. | |
| 2003/0004743 A1 | 1/2003 | Callegari | |
| 2003/0028872 A1 | 2/2003 | Milovanovic et al. | |
| 2003/0046704 A1 | 3/2003 | Laksono et al. | |
| 2003/0061619 A1 | 3/2003 | Giammaressi | |
| 2003/0067554 A1 | 4/2003 | Klarfeld et al. | |
| 2003/0088878 A1 | 5/2003 | Rogers et al. | |
| 2003/0118029 A1* | 6/2003 | Maher et al. | 370/395.21 |
| 2003/0135544 A1 | 7/2003 | Richardson | |
| 2003/0154242 A1 | 8/2003 | Hayes et al. | |
| 2003/0154246 A1 | 8/2003 | Ollikainen | |
| 2003/0236745 A1 | 12/2003 | Hartsell et al. | |
| 2004/0009761 A1 | 1/2004 | Money et al. | |
| 2004/0013119 A1* | 1/2004 | MeLampy et al. | 370/395.21 |
| 2004/0071085 A1 | 4/2004 | Shaham et al. | |
| 2004/0078814 A1 | 4/2004 | Allen | |
| 2004/0125757 A1 | 7/2004 | Mela et al. | |
| 2004/0183749 A1 | 9/2004 | Vertegaal | |
| 2004/0221304 A1 | 11/2004 | Sparrell et al. | |
| 2004/0226034 A1 | 11/2004 | Kaczowka et al. | |
| 2004/0255336 A1 | 12/2004 | Logan et al. | |
| 2004/0264563 A1 | 12/2004 | Inoue et al. | |
| 2004/0266407 A1 | 12/2004 | Lee et al. | |
| 2004/0268407 A1 | 12/2004 | Sparrell et al. | |
| 2004/0268410 A1 | 12/2004 | Barton et al. | |
| 2005/0002662 A1 | 1/2005 | Arpa et al. | |
| 2005/0007965 A1* | 1/2005 | Hagen et al. | 370/260 |
| 2005/0022239 A1 | 1/2005 | Meuleman | |
| 2005/0024543 A1 | 2/2005 | Ramaswamy et al. | |
| 2005/0039219 A1 | 2/2005 | Cooper et al. | |
| 2005/0066026 A1 | 3/2005 | Chen et al. | |
| 2005/0081252 A1 | 4/2005 | Chefalas et al. | |
| 2005/0097595 A1 | 5/2005 | Lipsanen et al. | |
| 2005/0108328 A1 | 5/2005 | Berkeland et al. | |
| 2005/0120113 A1 | 6/2005 | Bunch et al. | |
| 2005/0144640 A1 | 6/2005 | Fritsch et al. | |
| 2005/0183110 A1 | 8/2005 | Anderson | |
| 2005/0266825 A1 | 12/2005 | Clayton | |
| 2006/0013266 A1 | 1/2006 | Vega-Garcia et al. | |
| 2006/0025151 A1 | 2/2006 | Karaoguz et al. | |
| 2006/0028185 A1 | 2/2006 | Hernandez et al. | |
| 2006/0056389 A1 | 3/2006 | Monk et al. | |
| 2006/0095398 A1 | 5/2006 | Bhaskaran | |
| 2006/0114360 A1 | 6/2006 | Kortum et al. | |
| 2006/0125959 A1 | 6/2006 | Yoshizawa et al. | |
| 2006/0174266 A1 | 8/2006 | Gatto et al. | |
| 2006/0179466 A1 | 8/2006 | Pearson et al. | |
| 2006/0184780 A1 | 8/2006 | Yamada et al. | |
| 2006/0195866 A1 | 8/2006 | Thukral | |
| 2006/0204214 A1 | 9/2006 | Shah et al. | |
| 2006/0221826 A1 | 10/2006 | Bedingfield, Sr. et al. | |
| 2006/0222015 A1 | 10/2006 | Kafka et al. | |
| 2006/0222110 A1 | 10/2006 | Kuhtz | |
| 2006/0225106 A1 | 10/2006 | Bedingfield, Sr. | |
| 2006/0251116 A1 | 11/2006 | Bedingfield, Sr. et al. | |
| 2007/0133603 A1 | 6/2007 | Weaver et al. | |
| 2007/0136772 A1 | 6/2007 | Weaver et al. | |
| 2007/0169142 A1 | 7/2007 | Claassen et al. | |

OTHER PUBLICATIONS

"RFID News," Texas Instruments, Issue No. 20, 2000, Copyright—Nov. 2000, pp. 1-12.
U.S. Appl. No. 11/300,125, filed Dec. 14, 2005.
U.S. Appl. No. 11/300,061, filed Dec. 14, 2005.
U.S. Appl. No. 11/300,212, filed Dec. 14, 2005.

* cited by examiner

METHODS, SYSTEMS, AND COMPUTER PROGRAM PRODUCTS FOR IMPLEMENTING BANDWIDTH CONTROL SERVICES

CROSS-REFERENCE TO RELATED APPLICATIONS

This application claims priority to U.S. Provisional Application No. 60/667,018, filed on Mar. 31, 2005. This application is related to commonly assigned U.S. patent application Ser. No. 11/304,264, entitled METHODS, SYSTEMS, AND COMPUTER PROGRAM PRODUCTS FOR PROVIDING TRAFFIC CONTROL SERVICES, filed on Dec. 14, 2005. These applications are incorporated by reference herein in their entireties.

BACKGROUND

The present invention relates generally to communications services, and more particularly, to methods, systems, and computer program products for implementing bandwidth control services.

Digital Subscriber Line (DSL) technology is a copper loop transmission technology that provides increased bandwidth in the last mile between communication service providers and the users of these services. DSL technology provides broadband speed over a conventional phone wire, which in turn, allows service providers to provide multimedia applications, e.g., video, VoIP, Internet, etc., to their customers over their existing outside plant infrastructure.

Various services (e.g., television services), however, typically consume large amounts of bandwidth on a DSL connection. When multiple services (e.g., television, video/music downloading, gaming, etc.) are simultaneously utilized for a single account (e.g., household), the overall quality of these services can be negatively impacted due to strain on the available bandwidth (e.g., transmission delays or dropped packets), resulting in loss of quality, such as reduced VoIP voice quality. Customers may have some rudimentary knowledge of these issues and attempt to troubleshoot by activating and deactivating various services. However, they may not be able to resolve the issues unless they are given specific information about the nature of the issues and suggested courses of action for correcting the issues, and even then the complexities associated with potential solutions may be overwhelming to the user/customer. Further, the customer may not have direct control over various aspects of resources or the network which could be used to resolve or minimize such problems, such as packet priority, or other session flow control parameters.

What is needed, therefore, is a way to automatically monitor the various services and/or communications sessions, determine when negative interference or impacts between them may occur, and to control aspects of one or more services and/or resources and/or the communications network such that appropriate quality levels are maintained for the various services/sessions/users.

BRIEF SUMMARY

Exemplary embodiments include a method for implementing bandwidth management services. The method includes assigning a quality of service preference to a device. The method also includes associating a service session with the device. The method further includes executing a control action for at least one other simultaneously occurring service session when a quality of service level of the service session differs from the quality of service preference by a specified degree. The control action is operable for producing and maintaining the quality of service preference.

Additional embodiments include a system for implementing bandwidth management services. The system includes a processor executing a bandwidth control application. The bandwidth management application performs a method. The method includes assigning a quality of service preference to a device. The method also includes associating a service session with the device. The method further includes executing a control action for at least one other simultaneously occurring service session when a quality of service level of the service session differs from the quality of service preference by a specified degree. The control action is operable for producing and maintaining the quality of service preference.

Further embodiments include a computer program product for implementing bandwidth management services. The computer program product includes instructions for implementing a method. The method includes assigning a quality of service preference to a device. The method also includes associating a service session with the device. The method further includes executing a control action for at least one other simultaneously occurring service session when a quality of service level of the service session differs from the quality of service preference by a specified degree. The control action is operable for producing and maintaining the quality of service preference.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

In accordance with exemplary embodiments, bandwidth control services are provided, which include monitoring traffic and traffic types transiting a network connection, analyzing the traffic measurements, determining approximately when, and in what manner, simultaneously provided services (e.g., services provided over multiple simultaneous data sessions) are likely to interfere with, or otherwise impact each other, and to automatically adjust traffic policing or shaping or other control mechanisms in the network and/or to automatically adjust service parameters such as the level and timing of device/application requests or service/server responses or other service-related activity so as to correct the problem or avoid its occurrence, and further to automatically determine and implement the best coordinated combination of control via the above.

Figure 1:
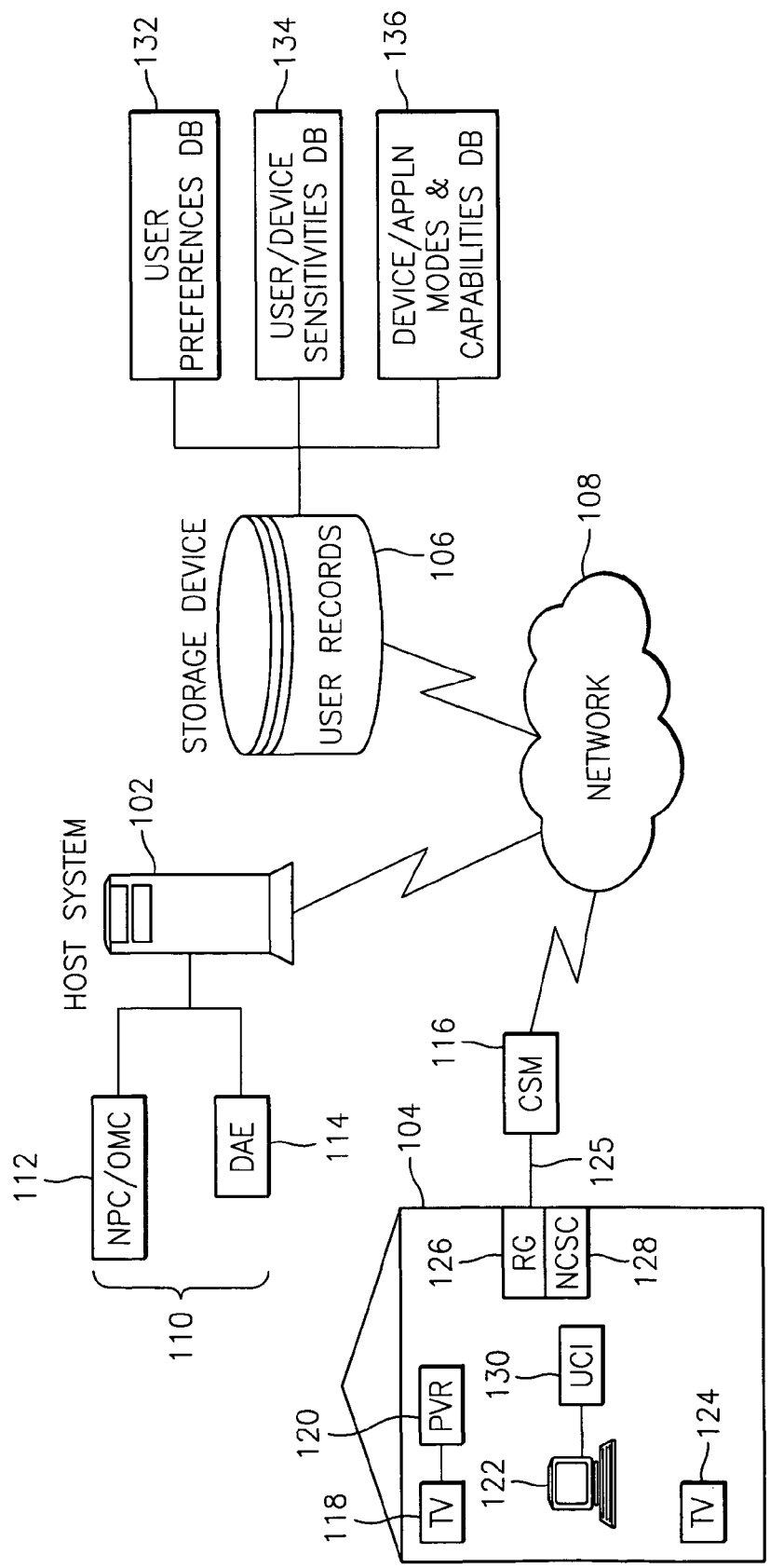
FIG. 1 is a system upon which the bandwidth control services may be implemented in exemplary embodiments.

Turning now to FIG. 1, a network system upon which the bandwidth management services may be implemented will now be described. In exemplary embodiments, the system of FIG. 1 includes a host system 102 in communication with customer premises 104 and a storage device 106 over one or more networks (e.g., network 108). The host system 102 may be implemented by a server operated by a service provider (e.g., provider of DSL services). The service provider provides DSL services (also referred to as service sessions) to customer premises (e.g., 104) via a pathway 125, which services are further distributed to the appropriate devices therein. While the system of FIG. 1 illustrates a single pathway 125 interconnecting the service provider of host system 102 to the customer premises 104, it will be appreciated that there may be many pathways leading to a single customer premises or to many separate customer premises and that the pathway 125 may include portions where services to multiple customers share the same pathway through a multiplexing scheme.

The server may be implemented using one or more processors operating in response to a computer program stored in a storage medium accessible by the server. The server may operate as a network server (e.g., a web server) to communicate with communications elements such as devices 118-124 and gateway 126. The server handles sending and receiving information to and from one or more communications elements and can perform associated tasks.

The server of host system 102 may also operate as an application server. The server executes one or more computer programs to implement the bandwidth control processes and related functions described herein. These one or more applications are referred to herein as a bandwidth control application 110. It will be understood that separate servers may be utilized to implement the network server functions and the application server functions.

The bandwidth control application 110 comprises a network policy controller/operating mode controller (NPC/OMC) 112 and a delta analysis engine (DAE) 114. Policies refer to rules that may be implemented via network elements (also referred to as 'resources'), such as routers, switches, gateways, firewalls, border controllers, edge devices, access node points, etc. under the direction of NPC/OMC 112. Policies may also be implemented via a network application programming interface (API) or network system accessed via a definable interface.

Operating modes refer to operations including parameter and/or control settings that may be implemented via an application or device for handling, e.g., video, audio, data, or multimedia under the direction of NPC/OMC 112. NPC/OMC 112 receives and processes deltas from DAE 114, translates the deltas into policy or control updates, and transmits these policy/control updates to one or more of devices 118-124, either directly or via a network connection and session controller (NCSC) 128. DAE 114 receives measurements, consults with relevant databases (e.g., databases 132-136), and performs analysis to determine problem situations, select a suitable mix of control measures, and determine updates. These elements are described further herein.

As shown in the system of FIG. 1, host system 102 is indirectly connected to a storage device 106 via network 108. However, it will be understood by those skilled in the art that host system 102 may be in direct communication with storage device 106 via, e.g., wireline or wireless technologies, etc. Alternatively, storage device 106 may be implemented using memory contained in the host system 102. Storage device 106 may be implemented using a variety of devices for storing electronic information. The storage device 106 may be logically addressable as a consolidated data source across a distributed environment that includes, e.g., network 108. Information stored in the storage device 106 may be retrieved and manipulated via the host system 102. The storage device 106 includes a data repository containing, e.g., documents, data, web pages, images, multimedia, etc.

In exemplary embodiments, storage device 106 stores a user preferences database 132, a user/device sensitivity database 134, a device/application modes and capabilities database 136, and other related data. User/device sensitivities database 134 stores data indicating the importance, or potential ramifications, of an item or event to a user or device. This may include the relative ability to leverage a particular control action or change in order to achieve a desired result, e.g., to achieve or preserve a particular quality level. For example, changing one parameter may have a larger effect than changing another parameter, thus the "sensitivity" associated with the first parameter is larger than that associated with the second parameter. Further, user/device sensitivities database 134 may store data affecting the desirability of exerting control via network policies versus device or application capabilities.

Device/application modes and capabilities database 136 may store specified needs, specified capabilities, associated operating parameter values/settings/ranges, associated limits, associated interface details, associated data formats, etc. For example, each of the devices may have associated service needs, such as minimum bandwidth requirements. For some devices, such as a personal computer, there may be different minimum bandwidth requirements depending upon the application utilized for a given session (e.g., video conferencing, music or file downloading, etc.). Device/application modes and capabilities database 136 may also store error conditions, compatibility data, and settings including parameter values that are determined to be useful in avoiding specified issues or problems. In an exemplary embodiment, the server of host system 102 operates as a database server and coordinates access to application data including data stored within the storage device 106.

Network 108 may be any type of known network including, but not limited to, a Local Area Network (LAN), a Wide Area Network (WAN), a global network (e.g., Internet), or other network configuration known in the art. These networks may be implemented using a wireless network or may be physically connected to each other in a state of the art configuration. Further, the network 108 may include wireless connections, radio based communications, telephony based communications, optical communications, and other network-based communications. If the network 108 is a LAN, then the bandwidth control application 110 and CSM 116 may reside within the customer premise 104.

Customer premises 104 may comprise, e.g., a residential entity or business establishment. Customer premises 104 include various devices that utilize DSL services provided by a service provider (e.g., host system 102) via one or more pathways (e.g., 125). These devices, in turn, may communicate with one another via, e.g., a local area network (LAN) implemented within customer premises 104. The network of customer premises 104 may be wireline, wireless, or a combination thereof. Devices residing in customer premises 104 may include, e.g., one or more computer systems (e.g., device 122), one or more televisions (e.g., devices 118 and 124), one or more personal video recorders (PVRs) (e.g., PVR 120), one or more telephony devices (not shown), and one or more applications (e.g., video chat, file download, video conferencing, interactive gaming, multi-media applications, etc.) executing on the aforementioned devices, to name a few.

Computer system 122 may comprise a personal computer, laptop, or other similar type of processing device. Computer system 122 may implement a variety of network-enabled applications, such as Internet gaming, interactive applications, video chat, graphical/pictorial applications, encryption tools, interactive multi-media applications, multi-media content, etc. In accordance with exemplary embodiments, computer system 122 utilizes a user control interface (UCI) 130 provided by the bandwidth control application 110, as will be described further herein. Television devices 118 and 124 may include a standard broadcast, cable, and/or premium channel-viewing device. Television devices 118 and 124 may also comprise network elements that support, e.g., Web TV. In addition, television devices 118 and 124 may include peripheral components, such as a set top box, remote control, personal video recorder (PVR) 120, or other suitable elements. It will be understood that any of these components may provide computing functions or operations. Telephony devices may comprise a wireline telephone, a cellular telephone, or other suitable voice communications device. Further, telephony devices may implement multi-media applications such as video/text messaging and related functions.

Customer premises 104 also includes a gateway, e.g., residential gateway (RG) 126 that may serve as a DSL modem and, optionally, a routing device to allow one or more of devices 118-124 to communicate via a DSL interface. The residential gateway 126 may also be used to provide a firewall to inhibit viruses from affecting the devices in the customer premises 104. In exemplary embodiments, the residential gateway 126 includes the network connection and session controller (NCSC) 128. In alternative exemplary embodiments, the NCSC 128 may reside in network 108, e.g., in a switch/router or access controller. NCSC 128 controls, limits and/or shapes traffic for each separate session present on a connection at the customer premises 104.

The residential gateway 126 of customer premises 104 communicates with network 108 via, e.g., a digital subscriber line access multiplexor (DSLAM) (not shown). The DSLAM concentrates traffic from multiple DSL loops onto a backbone network, which is part of the network 108. The DSLAM may, in some embodiments, operate on packets, frames, and/or messages passing therethrough. For example, to support dynamic IP address assignment, the DSLAM may inspect the IP address of packets to direct the packets to their proper destination.

It will be understood that one or more of the elements described with respect to customer premise 104 (e.g., 118-128) may perform the functions of 'resources' when tasked by the bandwidth control application 110 to implement a control action, as will be described further herein.

Also residing in the network 108 is connection and session monitor (CSM) 116, which is in the path of the network connection that supports the customer premises 104, in order to be able to perform bandwidth usage measurements and/or other traffic measurements relevant to the customer or user. For example, the CSM 116 may be running in a router or access concentrator of the network 108. The CSM 116 monitors bandwidth usage for customer premises 104.

The CSM 116 and NCSC 128 form a comprehensive monitoring and control system. For illustrative purposes, two monitoring/control devices 116 and 128 are shown in the system of FIG. 1. However, it will be appreciated that there may be more or fewer monitoring/control devices, depending on the need. In exemplary embodiments, each of the monitoring/control devices 116 and 128 receives the service destined for the specific customer premises 104 and each allows the service to continue e.g., over the network 108 and/or along the pathway 126 to the customer premises 104 so that service is not interrupted. However, these devices 116 and 128 collectively measure one or more characteristics of the service via the communications signal transmitted therethrough, such as voltage and/or power level and/or data rate and/or data delay/latency and/or data loss, and compares the measurement to a threshold or other criteria that defines what is to be expected or what is known to be acceptable to the customer of customer premises 104. The NCSC 128 controls and/or limits and/or shapes the traffic to one or more destinations (e.g., devices 118-124) based upon pre-defined policies as will be described further herein.

Figure 2:
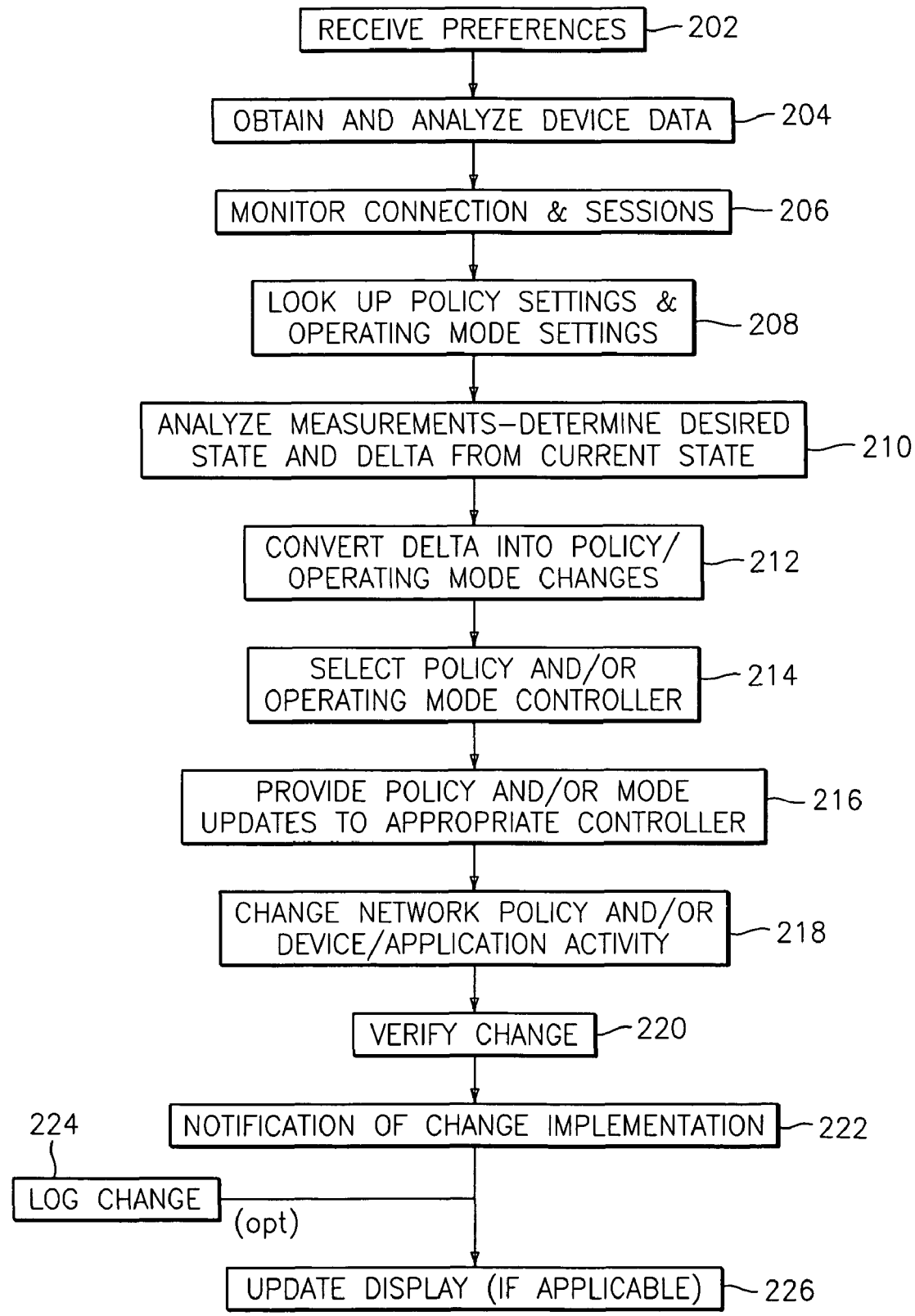
FIG. 2 is a flow diagram describing a process for implementing the bandwidth control services in exemplary embodiments.

Turning now to FIG. 2, a flow diagram describing a process for implementing the bandwidth control services will be described in accordance with exemplary embodiments. At step 202, the host system 102 receives customer input relating to quality of service preferences. This information may be obtained directly via, e.g., a web site accessible via a broadband modem or residential gateway 126. Alternatively, this information may be obtained indirectly via, e.g., the UCI 130 provided by the service provider that communicates to the CSM 116. A sample user interface 300 is shown and described in FIG. 3.

At step 204, device data is obtained and analyzed in order to determine the sensitivities and/or capabilities of the devices (e.g., 118-124) at customer premises 104. This information may be stored in databases 134 and 136, respectively. The device data may be acquired via, for example, the UCI 130, or may be determined by polling, queries, etc. For example, the bandwidth control application 110 may query devices and/or applications associated with a user. The polling, or querying, may occur continuously, periodically, randomly, as needed (e.g., triggered by an event such as a user logging in or signing off of a device or application), or conditionally (e.g., when pre-configured data is not found).

While the bandwidth control services are described herein with reference to end-user devices and service sessions, it will be understood that the functionality of the bandwidth control services may also be applied to servers, equipment, resources, etc., of a provider of the communication sessions. The operations of the servers, equipment, resources, etc., may be controlled via the bandwidth control application 110 in a manner similar to that described above with respect to the end user devices and sessions of customer premises 104.

At step 206, the CSM 116 monitors the connection at customer premises 104, including individual, simultaneously occurring sessions therein (e.g., one active PC 122 and related applications, one high definition TV 118, etc.). The CSM 116 monitors, for example, bandwidths, throughput, delay/latency, percent utilization, errors, etc. This information is provided to the DAE 114, e.g., on a periodic basis or continuous basis.

The DAE 114 consults with one or more databases 132-136 to determine previous policy settings and operating mode settings (i.e., current state information) at step 208. The DAE 114 analyzes the measurements to determine the desired state (e.g., a quality of service level specified in the preferences) and whether there exist any differences between, e.g., specified aspects of the current state and the desired state at step 210. The differences, or deltas, may be weighted based upon user and/or device/application sensitivities derived from database 134, current conditions, allowable contingencies, limits, rules/tables, etc., and evaluated with respect to the desirability of implementing a policy change (also referred to as control action) versus implementing a operating mode change (also referred to as control action). These deltas are then provided to the NPC/OMC 112.

The NPC/OMC 112 converts the deltas into policy changes or control actions, operating mode changes or control actions, or a combination of both at step 212. This may be implemented via mapping the deltas to desired policies or operating modes using pre-defined rules or tables. The NPC/OMC 112 then selects an appropriate policy and/or operating mode resource at step 214. The selected policy and/or operating mode changes are then provided to the selected resource controller for implementation at step 216. For example, the selected changes may be transmitted to NCSC 128 via CSM 116 and network 108.

The receiving controller (e.g., NCSC 128) executes the changes in accordance with the selected policy and/or operating mode at step 218. The NCSC 128 may be prompted to verify the success of the implemented change at step 220, and provide notification of said success to the NPC/OMC 112 via CSM 116 and network 108 at step 222.

Optionally, the change may be logged in storage device 106 (e.g., in one or more of databases 132-136) at step 224. Changes may be logged at a customer premises (e.g., 104) for use by a local device or application. A user of one or more devices 118-124 may be notified of the change that has been implemented via one of devices 118-124 or other suitable means of communication at step 226.

Figure 3:
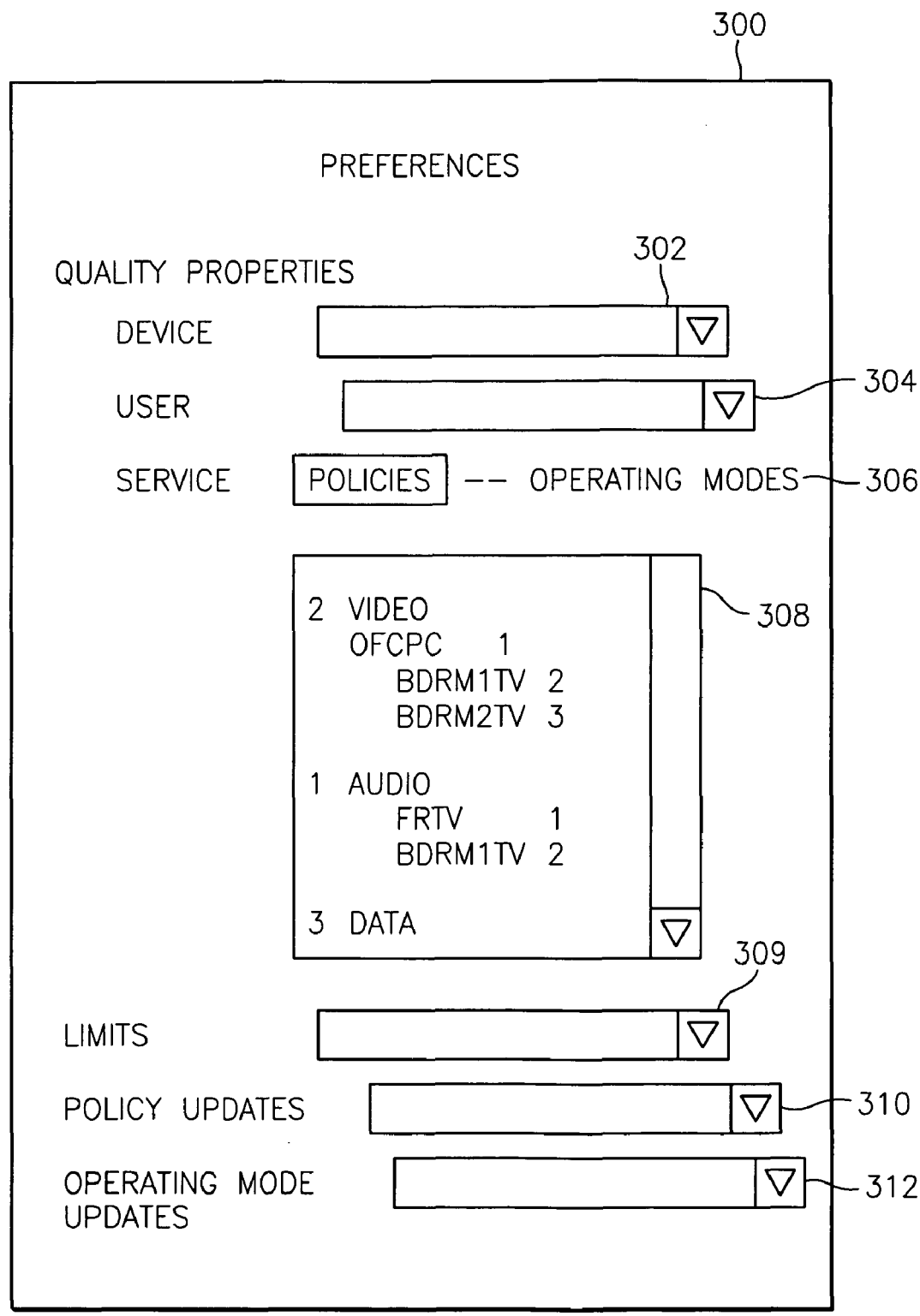
FIG. 3 is a user interface screen depicting options available for selection in facilitating implementation of the bandwidth control services in exemplary embodiments.

Turning now to FIG. 3, a sample user interface screen 300 for establishing user preferences will now be described. As indicated above, a user may implement the user preferences via UCI 130 provided to the user via, e.g., device 122, by the bandwidth control application 110. The user interface screen 300 of FIG. 3 enables a user to establish quality priorities based upon selected categories, such as devices, users, services, situations, etc. As shown in the user interface screen 300 of FIG. 3, quality of service priorities may be set by DEVICE option 302, USER option 304, and/or SERVICE option 306.

DEVICE option 302 includes a drop down field for selecting from a pre-defined list of devices (e.g., TVs, computers, cell phones, etc.) residing in the customer premises 104. In alternative embodiments, the user may be presented with a field for manual entry of a device. DEVICE option 302 enables a user to individually select quality settings based upon policies and/or operating modes for each device in customer premises 104. The priorities may be implemented using a numerical system (e.g., priority 1 is highest to priority 10 lowest). The user would then assign priorities for each device in the customer premises 104. To ensure that a device assigned a high priority achieves optimal quality of service levels, a policy may be defined, for example, that specifies that the device is to be allocated the highest acceptable bandwidth as compared to other simultaneously operating devices in the premises 104. The policies applied to each of the established priority levels may be defined commensurate with the nature of the applicable device and/or application. Operating mode settings may be selected for the devices via option 302 as well.

The quality priorities may be assigned based upon the type of user of the devices. This is implemented via the USER option 304. For example, a user-based priority for policy-based control may specify that activities conducted on devices assigned to one or more users at customer premises 104 are to be given a lower priority. The devices may be assigned to users by a user identification, a device location (e.g., PC in teenager's bedroom), or other suitable means of association. Likewise, operating modes may be selected for each user via option 304 as well.

The quality priorities may also be assigned based upon the type of service executing on the devices. This is implemented via the SERVICE option 306. For example, a service-based priority may specify that voice traffic for all devices (or users) be given a higher priority than web browsing. In another example, a priority may specify that video traffic for all devices (or users) be given a higher priority than any other application. These services may be ranked in order of priority among multiple devices and/or users. These policy-based priority assignments may result in a greater allocation of bandwidth to high-priority services.

In addition to assigning quality priorities according to device, user, and service, the bandwidth control application 110 may enable a user to prioritize quality controls within each category. For example, as shown in user interface screen 300, a user has selected the SERVICE option 306 and has further selected a policy-based assignment rather than an operating mode-based assignment. A subwindow 308 appears. The user has made policy-based assignments based upon services, namely audio=1, video=2, and data=3. Within each service category, the user may further establish policy-based priority assignments. Thus, as shown in the subwindow 308, for example, the user has selected OFCPC (office computer) to receive a higher priority than BDRM1TV. In addition, BDRM1TV has been selected to receive a higher priority than BDRM2TV.

A user may also select settings that further define quality priority assignments via the LIMITS option 309. For example, a user may specify that video traffic on OFCPC shall not exceed 80% of connection bandwidth and web browsing shall not exceed 10% of connection bandwidth. In another example, a user may specify that data traffic on a device shall not exceed 20% of connection bandwidth when video is present; otherwise, the data traffic shall not exceed 60% of connection bandwidth. In yet another example, a user may specify that specified traffic shall be implemented on a first come first serve basis, e.g., where devices have equal priority.

Policy changes or updates to existing devices or services may be designated by a user or may be automatically implemented by the bandwidth control application 110 as needed. If designated by a user, these changes may be entered via POLICY UPDATES option 310. For example, a policy update may specify that quality of service shall be increased or decreased by, e.g., a number of units. Alternatively, a policy update may specify that a bandwidth limit shall be increased or decreased by a percentage of the total bandwidth or by a number of Mbps, etc.

Likewise, operating mode changes or updates to existing devices or services may be designated by a user or may be automatically implemented by the bandwidth control application 110 as needed. If designated by a user, these changes may be entered via OPERATING MODE UPDATES option 312. For example, an operating mode update may specify that a compression ratio shall be made higher or lower. In another example, an operating mode update may specify that a parameter be changed, e.g., immediately, or at a selected rate until a condition is met or event is reached. In yet another example, an operating mode update may specify that a device or application be turned off or on, or to a particular state (e.g., standby, dormant) until a condition is met or trigger occurs. In addition, an operating mode may specify a change in time in which a service is provided. For example, a user of PVR 120 wishes to record a program, however, the current state of bandwidth utilization is high due to other sessions implemented by various resources. An operating mode may specify a later time in which to record the program (e.g., via a lower priority established for PVR 120), thereby limiting or controlling the bandwidth utilization for the connection.

In exemplary embodiments, the bandwidth control application 110 may include a training model or learning algorithm for each customer premises such that customer preferences may be implied by the bandwidth control application 110 based upon customer history and patterns. The bandwidth control application 110 may record information regarding typical customer usage patterns, translate this information into a situational description (e.g., via rule selection and parameter settings), and periodically update this information.

As indicated above, the bandwidth control services monitor customer traffic in terms of bandwidth and/or other communications characteristics or aspects, analyze the traffic measurements, determine approximately when, and in what manner, simultaneously provided services (e.g., services provided over multiple simultaneous data sessions) are likely to interfere with or otherwise impact each other, and to automatically adjust traffic policing or shaping or other control mechanisms in the network and/or to automatically adjust device and/or service provider-related and/or service parameters such as the level and timing of device/application requests or service/server responses or other service-related activity so as to correct the problem or avoid its occurrence, and further to automatically determine and implement the best coordinated combination of control via the above.

In exemplary embodiments, user preferences may be established presenting the user with an available fixed quantity of graphical objects or icons, each of which represents an amount of traffic capacity, the number of objects increasing or decreasing according to the capacity of the data connection. The user may then place a desired number of "bandwidth objects" into an area on the user interface screen representing a specific device or session, or general type of session (e.g., video, telephony, music downloading). In this way, the user is provided with a visual indication of the relative capacity assignments. Other methods may also be used, including, for example, adjusting the segments of a pie chart.

As described above, the exemplary embodiments can be implemented in the form of computer-implemented processes and apparatuses for practicing those processes. The exemplary embodiments can also be implemented in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the embodiments. Exemplary embodiments can also be implemented in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing bandwidth control services, comprising:

assigning, via a computer processor, a quality of service preference to a device identified for a physical premises;

associating, via the computer processor, a service session with the device;

monitoring, via the computer processor, the service session and another concurrently running service session, the other concurrently running service session implemented by another device co-located with the device identified for the physical premises, the monitoring including analyzing measurements for the service session and determining a current state;

identifying differences between aspects of the current state and a desired state indicated by the quality of service preference;

evaluating, via the computer processor:

user quality of service preferences associated with the device, sensitivities associated with the device; and capabilities indicating service needs associated with the device;

applying a weight to the differences based on the sensitivities;

mapping the differences, resulting from the applying weights, to a corresponding policy; and executing, via the computer processor, a control action for the other concurrently running service session based on the corresponding policy.

2. The method of claim 1, further comprising selecting a resource from a set of resources to facilitate the control action.

3. The method of claim 2, wherein the set of resources selectable for facilitating the control action include:

network elements providing the service session and the other concurrently running service session;

the device;

the other device engaged in the other concurrently running service session;

an application executing on the device;

an application executing on the other device;

a peripheral component in communication with the device;

a peripheral component in communication with the other device;

an entity providing the service session; and an entity providing the other concurrently running service session.

4. The method of claim 1, wherein the policy includes a rule that when executed, limits a transfer of traffic to and from the other device.

5. The method of claim 4, wherein the policy specifies prioritization of bandwidth allocation to the other device.

6. The method of claim 1, wherein the device comprises a first type and employs a first technology, and the other device comprises a second type and employs a second technology;

wherein the first type is different than the second type, and the first technology is different than the second technology.

7. The method of claim 1, further comprising:
assigning the quality of service preference to a user of the device via an identifier of the user; and
associating the service session with the user of the device;
wherein the quality of service preference is selected by user of the device.

8. A system for implementing bandwidth control services, comprising:
a processor;
a bandwidth control application executing on the processor, performing:
assigning a quality of service preference to a device identified for a physical premises;
associating a service session with the device;
monitoring the service session and another concurrently running service session, the other concurrently running service session implemented by another device co-located with the device identified for the physical premises, the monitoring including analyzing measurements for the service session and determining a current state;
identifying differences between aspects of the current state and a desired state indicated by the quality of service preference;
evaluating user preferences associated with the device, the user preferences including the quality of service preference, the quality of service preference is selected by a user of the device;
evaluating sensitivities and capabilities associated with the device;
applying a weight to the differences based on the sensitivities;
mapping the differences, resulting from the applying weights, to a corresponding policy; and
executing a control action for the other concurrently running service session based on the corresponding policy.

9. The system of claim 8, wherein the bandwidth control application further performs:
selecting a resource from a set of resources to facilitate the control action.

10. The system of claim 9, wherein the set of resources includes:
network elements providing the service session and the other concurrently running service session;
the device;
the other device engaged in the other concurrently running service session;
an application executing on the device;
an application executing on the other device;
a peripheral component in communication with the other device;
an entity providing the service session; and
an entity providing the other concurrently running service session.

11. The system of claim 8, wherein the control action includes an operating mode-based action including a rule that when executed, modifies a mode of operation of the other device.

12. The system of claim 11, wherein the operating mode-based priority specifies a change in a ratio of data compression functions performed at the other device.

13. The system of claim 8, wherein the service session is a communications session utilizing bandwidth.

14. The system of claim 8, wherein the bandwidth control application further performs:

assigning the quality of service preference to the user of the device via an identifier of the user; and
associating the service session with the user of the device.

15. A computer program product for implementing bandwidth control services, the computer program product including a non-transitory computer readable medium containing computer executable code to perform a method, the method comprising:
assigning a quality of service preference to a device identified for a physical premises;
associating a service session with the device;
monitoring the service session and another concurrently running service session, the other concurrently running service session implemented by another device co-located with the device identified for the physical premises, the monitoring including analyzing measurements for the service session and determining a current state;
identifying differences between aspects of the current state and a desired state indicated by the quality of service preference;
evaluating:
user preferences associated with the device, the user preferences including the quality of service preference;
sensitivities associated with the device; and
capabilities associated with the device;
applying a weight to the differences based on the sensitivities;
mapping the differences, resulting from the applying weights, to a corresponding policy; and
executing a control action for the other concurrently running service session based on the corresponding policy.

16. The computer program product of claim 15, further comprising instructions for implementing:
selecting a resource from a set of resources to facilitate the control action.

17. The computer program product of claim 16, wherein the set of resources includes:
network elements providing the service session and the other concurrently running service session;
the device;
the device engaged in the other concurrently running service session;
an application executing on the device;
an application executing on the other device;
a peripheral component in communication with the device;
a peripheral component in communication with the other device;
an entity providing the service session; and
an entity providing the other concurrently running service session.

18. The computer program product of claim 15, wherein the policy includes:
a rule that when executed, limits a transfer of traffic to and from the other device; and
an operating mode-based action including a rule that when executed, modifies a mode of operation of the other device.

19. The computer program product of claim 18, wherein the policy specifies prioritization of bandwidth allocation to the other device and the operating mode-based action specifies a change in a ratio of data compression functions performed at the other device.

20. The computer program product of claim 15, wherein the service session is a communications session utilizing bandwidth.

* * * * *